United States Patent
Liu

(10) Patent No.: US 10,447,703 B2
(45) Date of Patent: Oct. 15, 2019

(54) VNF PACKAGE OPERATION METHOD AND APPARATUS

(71) Applicant: HUAWEI TECHNOLOGIES CO., LTD., Shenzhen, Guangdong (CN)

(72) Inventor: Jianning Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 216 days.

(21) Appl. No.: 15/677,407

(22) Filed: Aug. 15, 2017

(65) Prior Publication Data

US 2017/0346831 A1 Nov. 30, 2017

Related U.S. Application Data

(63) Continuation of application No. PCT/CN2015/073176, filed on Feb. 16, 2015.

(51) Int. Cl.
| | |
|---|---|
| *H04L 29/06* | (2006.01) |
| *G06F 9/455* | (2018.01) |
| *H04L 29/08* | (2006.01) |
| *G06F 21/12* | (2013.01) |
| *G06F 21/53* | (2013.01) |

(52) U.S. Cl.
CPC ............ *H04L 63/102* (2013.01); *G06F 9/455* (2013.01); *G06F 9/45558* (2013.01); *G06F 21/121* (2013.01); *G06F 21/53* (2013.01); *H04L 29/08* (2013.01); *G06F 2009/45587* (2013.01); *G06F 2009/45595* (2013.01)

(58) Field of Classification Search
CPC .................................................. H04L 63/102
USPC ............................................................ 726/4
See application file for complete search history.

(56) References Cited

U.S. PATENT DOCUMENTS

| | | | |
|---|---|---|---|
| 2014/0317261 A1 | 10/2014 | Shatzkamer et al. | |
| 2014/0317293 A1 | 10/2014 | Shatzkamer | |
| 2019/0109762 A1* | 4/2019 | Andrianov | .......... H04L 41/0813 |

FOREIGN PATENT DOCUMENTS

| | | |
|---|---|---|
| CN | 104050045 | 9/2014 |
| CN | 104219127 | 12/2014 |
| CN | 104253866 A | 12/2014 |

OTHER PUBLICATIONS

"Network Functions Virtualisation (NFV); Management and Orchestration," ETSI GS NFV-MAN 001, V1.1.1, Dec. 2014, XP14235740A, 184 pgs.

(Continued)

*Primary Examiner* — Jacob Lipman
(74) *Attorney, Agent, or Firm* — Kilpatrick Townsend & Stockton, LLP

(57) ABSTRACT

The present invention relates to the field of communications technologies, and in particular, to a VNF package operation method and apparatus, so as to resolve a technical problem of relatively poor information security because a current VNF package is targeted at all user equipments instead of only some user equipments. A private type is defined in embodiments of the present invention. If a type of a VNF package is the private type, only an authorized user is allowed to use this VNF package, so that the VNF package can be opened to only some user equipments. A specific authorization scope may be self-defined. Therefore, information security is improved, and the problem that cannot be resolved in the prior art is resolved, so as to provide a better service for a user.

16 Claims, 3 Drawing Sheets

(56) References Cited

OTHER PUBLICATIONS

Extended European Search Report dated Mar. 14, 2018, in corresponding European Patent Application No. 15882311.2, 7 pgs.
King, D. et al., Virtualisation of Mobile Core Network Use Case, Network Working Group, Jun. 8, 2014 (15 pages).
International Search Report, dated Nov. 17, 2015, in International Application No. PCT/CN2015/073176 (4 pages).
International Search Report dated Nov. 17, 2015 in corresponding International Application No. PCT/CN2015/073176.

* cited by examiner

VNF PACKAGE OPERATION METHOD AND APPARATUS

CROSS-REFERENCE TO RELATED APPLICATIONS

This application is a continuation of International Application No. PCT/CN2015/073176, filed on Feb. 16, 2015, the disclosure of which is hereby incorporated by reference in its entirety.

TECHNICAL FIELD

The present invention relates to the field of communications technologies, and in particular, to a VNF package operation method and apparatus.

BACKGROUND

Initiated by thirteen main telecommunications operators in the world, Network Functions Virtualization (NFV) is an organization in which numerous device vendors, Information Technology (IT) vendors, and the like participate. The NFV is intended to define a requirement of operator network functions virtualization and a related technical report, and expects to implement some network functions in a software form by means of an IT virtualization technology and using a general high-performance and high-capacity server, a switch, and a storage device. For example, software and hardware separation may be implemented for various network devices, such as a server, a router, a Content Delivery Network (CDN) storage device, and a switch by using a NFV technology. The devices may be deployed at a data center, a network node, a user home, or the like.

A Virtualized Network Function (VNF) package defined in a current NFV standard is targeted at all users. That is, any one VNF package may be directly used by many user equipments.

Currently, network security gains more attention. Some users may not agree to share a self-defined VNF package with other user equipment. Alternatively, it is better if some VNF packages are opened only to some user equipments. However, this function cannot be implemented in the prior art, resulting in relatively poor information security.

SUMMARY

Embodiments of the present invention provide a VNF package operation method and apparatus, so as to resolve a technical problem of relatively poor information security because a current VNF package is targeted at all user equipments instead of only some user equipments.

According to a first aspect of the present invention, a VNF package operation method is provided, including:
 receiving a first request message for a VNF package;
 determining whether a type of the VNF package is a private type, where the private type indicates that only an authorized user is allowed to use the VNF package; and
 performing operation on record information about the VNF package according to the first request message if the type of the VNF package is the private type and the first request message carries a value of a scope parameter of an authorized user corresponding to the VNF package; or
 rejecting to respond to the first request message if the type of the VNF package is the private type and the first request message does not carry a value of a scope parameter of an authorized user corresponding to the VNF package, where the record information about the VNF package includes a value of at least one parameter of the VNF package.

With reference to the first aspect, in a first possible implementation of the first aspect, the performing operation on record information about the VNF package according to the first request message if the type of the VNF package is the private type and the first request message carries a value of a scope parameter of an authorized user corresponding to the VNF package includes:
 determining whether the value of the scope parameter is consistent with a preset value of the scope parameter of the authorized user for the VNF package, if the type of the VNF package is the private type and the first request message carries the value of the scope parameter of the authorized user corresponding to the VNF package; and
 performing operation on the record information according to the first request message if the value of the scope parameter is consistent with the preset value of the scope parameter of the authorized user for the VNF package.

With reference to the first possible implementation of the first aspect, in a second possible implementation of the first aspect, the first request message is used to request to query, in the record information, a value of a first parameter of the VNF package; and
 the performing operation on the record information according to the first request message includes:
 querying, in the record information, the value of the first parameter according to the first request message.

With reference to the first possible implementation of the first aspect, in a third possible implementation of the first aspect, the first request message is used to request to change a value that is of a first parameter of the VNF package and that is recorded in the record information; and
 the performing operation on the record information according to the first request message includes:
 updating the value of the first parameter in the record information to an expected value according to the expected value that is of the first parameter and that is carried in the first request message.

With reference to the first possible implementation of the first aspect, in a fourth possible implementation of the first aspect, the first request message carries information about first user equipment, and the first request message is used to request to close permission of using the VNF package by the first user equipment;
 the determining whether the value of the scope parameter is consistent with a preset value of the scope parameter of the authorized user for the VNF package, if the type of the VNF package is the private type and the first request message carries the value of the scope parameter of the authorized user for the VNF package includes:
 if the type of the VNF package is the private type and the first request message carries the value of the scope parameter of the authorized user for the VNF package, determining whether the value of the scope parameter is consistent with a preset value of a scope parameter of the authorized first user equipment for the VNF package; and
 the performing operation on the record information according to the first request message if the value of the scope parameter is consistent with the preset value of the scope parameter of the authorized user for the VNF package includes:
 if the value of the scope parameter is consistent with the preset value of the scope parameter of the authorized first user equipment for the VNF package, updating, according to the first request message and the information about the first user equipment, a value that is of a parameter of an authorized user for the VNF package and that is recorded in the record information, where an updated value of the parameter of the authorized user is used to indicate that the first user equipment has no permission to use the VNF package.

With reference to the first possible implementation of the first aspect, in a fifth possible implementation of the first aspect, the first request message carries information about second user equipment, and the first request message is used to request to authorize the second user equipment to use the VNF package; and the performing operation on the record information according to the first request message includes:

updating, according to the value of the scope parameter and the information about the second user equipment, a value that is of a parameter of an authorized user for the VNF package and that is recorded in the record information, where an updated value of the parameter of the authorized user is used to indicate that the second user equipment has permission to use the VNF package.

With reference to any one of the first aspect, or the first possible implementation to the fifth possible implementation of the first aspect, in a sixth possible implementation of the first aspect, before the receiving a first request message for a VNF package, the method further includes:

receiving a second request message, where the second request message is used to request to create the record information, and the second request message carries the value of the at least one parameter in the record information;

extracting the value that is of the at least one parameter and that is carried in the second request message; and instructing, according to the value of the at least one parameter, a VNF catalog to create the record information.

With reference to any one of the first aspect, or the first possible implementation to the sixth possible implementation of the first aspect, in a seventh possible implementation of the first aspect, after the determining whether a type of the VNF package is a private type, the method further includes:

performing operation on the record information according to the first request message if the type of the VNF package is not the private type.

According to a second aspect of the present invention, a VNF package operation apparatus is provided, including a memory, a processor, and a receiver that are connected to a same bus, where the memory is configured to store an instruction;

the receiver is configured to receive a first request message for a VNF package; and the processor is configured to execute the instruction to: determine whether a type of the VNF package is a private type, where the private type indicates that only an authorized user is allowed to use the VNF package; and perform operation on record information about the VNF package according to the first request message if the type of the VNF package is the private type and the first request message carries a value of a scope parameter of an authorized user corresponding to the VNF package; or reject to respond to the first request message if the type of the VNF package is the private type and the first request message does not carry a value of a scope parameter of an authorized user corresponding to the VNF package, where the record information about the VNF package includes a value of at least one parameter of the VNF package.

With reference to the second aspect, in a first possible implementation of the second aspect, that the processor is configured to perform operation on record information about the VNF package according to the first request message if the type of the VNF package is the private type and the first request message carries a value of a scope parameter of an authorized user corresponding to the VNF package is specifically:

if the type of the VNF package is the private type and the first request message carries the value of the scope parameter of the authorized user corresponding to the VNF package, determining whether the value of the scope parameter is consistent with a preset value of the scope parameter of the authorized user for the VNF package; and performing operation on the record information according to the first request message if the value of the scope parameter is consistent with the preset value of the scope parameter of the authorized user for the VNF package.

With reference to the first possible implementation of the second aspect, in a second possible implementation of the second aspect, the first request message is used to request to query, in the record information, a value of a first parameter of the VNF package; and that the processor is specifically configured to perform operation on the record information according to the first request message is specifically:

querying, in the record information, the value of the first parameter according to the first request message.

With reference to the first possible implementation of the second aspect, in a third possible implementation of the second aspect, the first request message is used to request to change a value that is of a first parameter of the VNF package and that is recorded in the record information; and that the processor is specifically configured to perform operation on the record information according to the first request message is specifically:

updating the value of the first parameter in the record information to an expected value according to the expected value that is of the first parameter and that is carried in the first request message.

With reference to the first possible implementation of the second aspect, in a fourth possible implementation of the second aspect, the first request message carries information about first user equipment, and the first request message is used to request to close permission of using the VNF package by the first user equipment;

that the processor is specifically configured to: if the type of the VNF package is the private type and the first request message carries the value of the scope parameter of the authorized user for the VNF package, determine whether the value of the scope parameter is consistent with a preset value of the scope parameter of the authorized user for the VNF package is specifically:

if the type of the VNF package is the private type and the first request message carries the value of the scope parameter of the authorized user for the VNF package, determining whether the value of the scope parameter is consistent with a preset value of a scope parameter of the authorized first user equipment for the VNF package; and that the processor is specifically configured to perform operation on the record information according to the first request message if the value of the scope parameter is consistent with the preset value of the scope parameter of the authorized user for the VNF package is specifically:

if the value of the scope parameter is consistent with the preset value of the scope parameter of the authorized first user equipment for the VNF package, updating, according to the first request message and the information about the first user equipment, a value that is of a parameter of an authorized user for the VNF package and that is recorded in the record information, where an updated value of the parameter of the authorized user is used to indicate that the first user equipment has no permission to use the VNF package.

With reference to the first possible implementation of the second aspect, in a fifth possible implementation of the second aspect, the first request message carries information about second user equipment, and the first request message is used to request to authorize the second user equipment to use the VNF package; and that the processor is specifically configured to perform operation on the record information according to the first request message is specifically:

updating, according to the value of the scope parameter and the information about the second user equipment, a value that is of a parameter of an authorized user for the VNF package and that is recorded in the record information, where an updated value of the parameter of the authorized user is used to indicate that the second user equipment has permission to use the VNF package.

With reference to any one of the second aspect, or the first possible implementation to the fifth possible implementation of the second aspect, in a sixth possible implementation of the second aspect, the receiver is further configured to:

receive a second request message before receiving the first request message for the VNF package, where the second request message is used to request to create the record information, and the second request message carries the value of the at least one parameter in the record information; and the processor is further configured to:

extract the value that is of the at least one parameter and that is carried in the second request message; and instruct, according to the value of the at least one parameter, a VNF catalog to create the record information.

With reference to any one of the second aspect, or the first possible implementation to the sixth possible implementation of the second aspect, in a seventh possible implementation of the second aspect, the processor is further configured to:

after determining whether the type of the VNF package is the private type, perform operation on the record information according to the first request message if the type of the VNF package is not the private type.

According to a third aspect of the present invention, a VNF package operation apparatus is provided, including:

a receiving module, configured to receive a first request message for a VNF package;

a determining module, configured to determine whether a type of the VNF package is a private type, where the private type indicates that only an authorized user is allowed to use the VNF package; and an operation module, configured to: perform operation on record information about the VNF package according to the first request message if the type of the VNF package is the private type and the first request message carries a value of a scope parameter of an authorized user corresponding to the VNF package; or reject to respond to the first request message if the type of the VNF package is the private type and the first request message does not carry a value of a scope parameter of an authorized user corresponding to the VNF package, where the record information about the VNF package includes a value of at least one parameter of the VNF package.

With reference to the third aspect, in a first possible implementation of the third aspect, that the operation module is configured to perform operation on record information about the VNF package according to the first request message if the type of the VNF package is the private type and the first request message carries a value of a scope parameter of an authorized user corresponding to the VNF package is specifically:

if the type of the VNF package is the private type and the first request message carries the value of the scope parameter of the authorized user corresponding to the VNF package, determining whether the value of the scope parameter is consistent with a preset value of the scope parameter of the authorized user for the VNF package; and performing operation on the record information according to the first request message if the value of the scope parameter is consistent with the preset value of the scope parameter of the authorized user for the VNF package.

With reference to the first possible implementation of the third aspect, in a second possible implementation of the third aspect, the first request message is used to request to query, in the record information, a value of a first parameter of the VNF package; and that the operation module is configured to perform operation on the record information according to the first request message is specifically:

querying, in the record information, the value of the first parameter according to the first request message.

With reference to the first possible implementation of the third aspect, in a third possible implementation of the third aspect, the first request message is used to request to change a value that is of a first parameter of the VNF package and that is recorded in the record information; and that the operation module is configured to perform operation on the record information according to the first request message is specifically:

updating the value of the first parameter in the record information to an expected value according to the expected value that is of the first parameter and that is carried in the first request message.

With reference to the first possible implementation of the third aspect, in a fourth possible implementation of the third aspect, the first request message carries information about first user equipment, and the first request message is used to request to close permission of using the VNF package by the first user equipment;

that the operation module is configured to: if the type of the VNF package is the private type and the first request message carries the value of the scope parameter of the authorized user for the VNF package, determine whether the value of the scope parameter is consistent with a preset value of the scope parameter of the authorized user for the VNF package is specifically:

if the type of the VNF package is the private type and the first request message carries the value of the scope parameter of the authorized user for the VNF package, determining whether the value of the scope parameter is consistent with a preset value of a scope parameter of the authorized first user equipment for the VNF package; and that the operation module is configured to perform operation on the record information according to the first request message if the value of the scope parameter is consistent with the preset value of the scope parameter of the authorized user for the VNF package is specifically:

if the value of the scope parameter is consistent with the preset value of the scope parameter of the authorized first user equipment for the VNF package, updating, according to the first request message and the information about the first user equipment, a value that is of a parameter of an authorized user for the VNF package and that is recorded in the record information, where an updated value of the parameter of the authorized user is used to indicate that the first user equipment has no permission to use the VNF package.

With reference to the first possible implementation of the third aspect, in a fifth possible implementation of the third aspect, the first request message carries information about second user equipment, and the first request message is used to request to authorize the second user equipment to use the VNF package; and that the operation module is configured to perform operation on the record information according to the first request message is specifically:

updating, according to the value of the scope parameter and the information about the second user equipment, a value that is of a parameter of an authorized user for the VNF package and that is recorded in the record information, where an updated value of the parameter of the authorized user is used to indicate that the second user equipment has permission to use the VNF package.

With reference to any one of the third aspect, or the first possible implementation to the fifth possible implementation of the third aspect, in a sixth possible implementation of the third aspect, before the receiving a first request message for the VNF package, the method further includes:

receiving a second request message, where the second request message is used to request to create the record information, and the second request message carries the value of the at least one parameter in the record information;

extracting the value that is of the at least one parameter and that is carried in the second request message; and instructing, according to the value of the at least one parameter, a VNF catalog to create the record information.

With reference to any one of the third aspect, or the first possible implementation to the sixth possible implementation of the third aspect, in a seventh possible implementation of the third aspect, after the determining whether a type of the VNF package is a private type, the method further includes:

performing operation on the record information according to the first request message if the type of the VNF package is not the private type.

In the embodiments of the present invention, a private type of a VNF package is defined. If a type of a VNF package is the private type, only an authorized user is allowed to use this VNF package, so that the VNF package can be opened to only some user equipments. A specific authorization scope may be self-defined. Therefore, information security is improved, and the problem that cannot be resolved in the prior art is resolved, so as to provide a better service for a user.

In addition, in the embodiments of the present invention, if operation needs to be performed on record information about a VNF package of the private type, the first request message needs to carry a value of a scope parameter of an authorized user corresponding to the VNF package. In this way, operation can be performed on the record information about the VNF package. Otherwise, if the first request message does not carry a value of a scope parameter of an authorized user corresponding to the VNF package, an operation on the record information about the VNF package may be rejected, that is, a response to the first request message is rejected. Certainly, no operation result is fed back to a requester. For example, if user equipment beyond a scope of an authorized user for the VNF package intends to perform operation on the record information about the VNF package, the first request message sent by this user equipment may not carry the value of the scope parameter of the authorized user corresponding to the VNF package. Therefore, a receiver rejects the operation. In this way, information security can be protected as far as possible, and a new VNF package management and operation method is provided.

DESCRIPTION OF EMBODIMENTS

Figure 1:
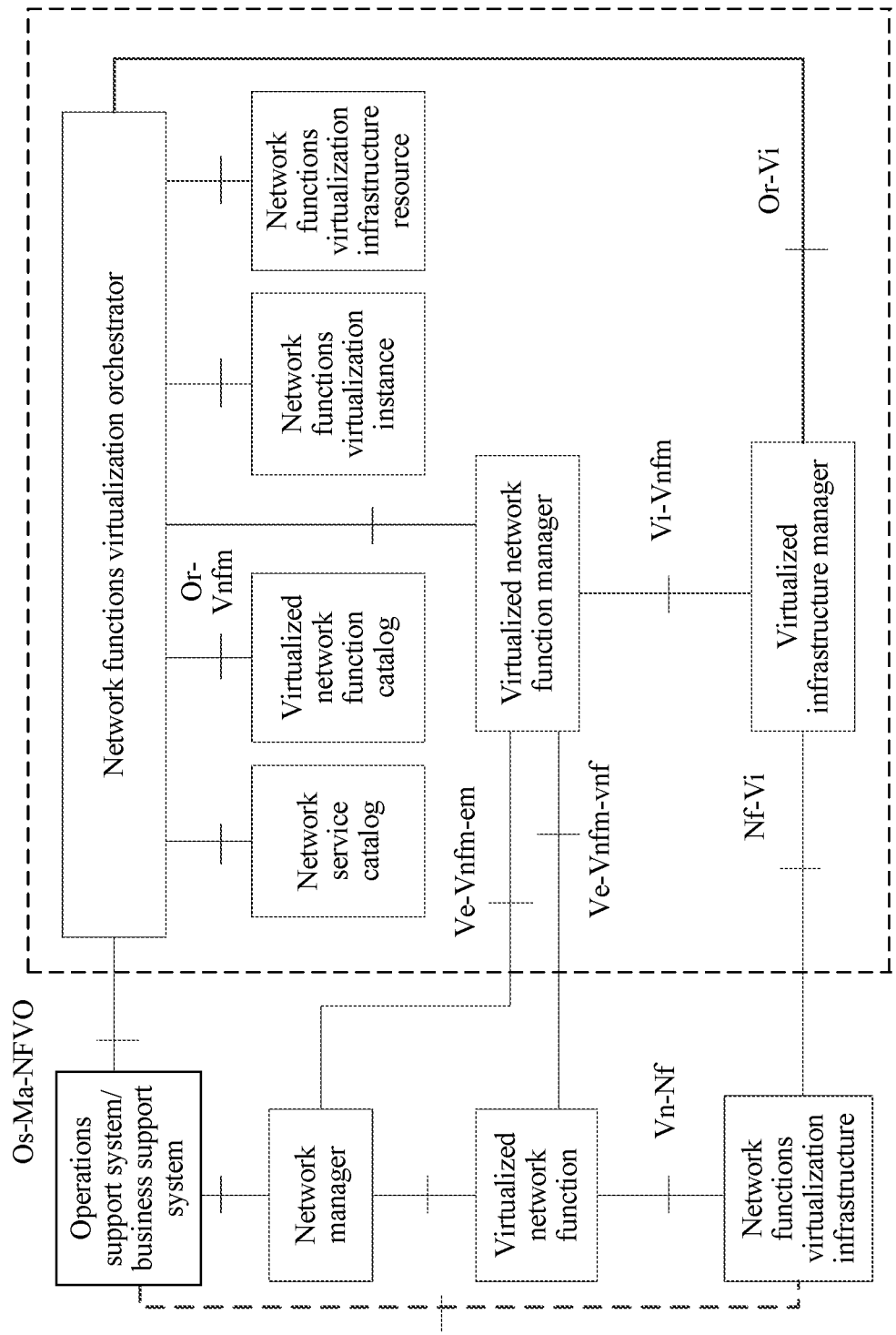
FIG. 1 is a possible hardware architecture diagram of NFV E2E according to an embodiment of the present invention.

To better describe a technical solution in the present invention, referring to FIG. 1, a possible hardware architecture of NFV End to End (E2E) is first described.

Function modules shown in FIG. 1 are described as follows:

Operations Support System (OSS)/Business support system (BSS):

configured to initiate a service request to an NFV orchestrator (NFVO) and request a resource required for a service, and responsible for troubleshooting.

NFV orchestrator: responsible for orchestrating and managing resources according to the service request of the OSS/BSS to implement a network service and monitor resource and running status information about a VNF and an NFV Infrastructure (NFVI) in real time.

Virtualized Network Function Manager (VNFM): responsible for managing a VNF life cycle, for example, information about a start time, time to live, and a VNF running status.

Virtualized Infrastructure Manager (VIM): responsible for managing and allocating an NFVI resource, and monitoring and collecting NFVI running status information.

Element Manager (EM): responsible for element management, including element performance monitoring, service configuration, and the like.

Network Service (NS) catalog: stores all uploaded Network Service Descriptor (NSDs), and supports establishment and management of deployment templates such as an NSD, a Virtual Link Descriptor (VLD), and a VNF forwarding Graph Descriptor (VNFFGD).

VNF catalog: stores all uploaded VNF packages, and supports establishment and management of a VNF Descriptor (VNFD), a software image, and another list.

NFV instance repository: stores information about all VNF instances and NS instances.

NFVI resources repository: stores information about an available/reserved/allocated NFVI resource.

Related interfaces shown in FIG. 1 are described as follows.

Ve-Vnfm: responsible for VNF life cycle management and configuration information interaction.

Or-Vnfm: responsible for requesting a resource for VNF life cycle management, sending configuration information, and collecting status information.

Vi-Vnfm: responsible for a resource allocation request, virtualized resource configuration, and status information interaction.

Or-Vi: responsible for a resource reservation and allocation request, virtualized resource configuration, and status information interaction.

Nf-Vi: responsible for specific resource allocation, virtualized resource status information interaction, and hardware resource configuration.

Vn-Nf: used by the NFVI to provide an actual execution environment for the VNF.

Os-Ma: responsible for VNF life cycle management, service graph (service graph) life cycle management, policy management, and the like.

A part in a right dashed-line box in FIG. 1 may be referred to as an NFV Management and Orchestration (NFV-MANO) domain. All function modules in the domain may be located in one network entity, or may be separately located in different network entities. Alternatively, some of the function modules may be located in one network entity. There may be multiple specific implementations. This is not limited in the present invention.

In addition, embodiments of the present invention propose a concept of VNF package record (VPR) information. The VNF package record information may include some parameters of a VNF package. For example, these parameters may be an attribute parameter and/or a status parameter of the VNF package, and the like. Differentiated management is performed on different VNF packages by using different values of these parameters.

For example, parameters that may be included in possible VNF package record information are described as follows:

Identity (ID): is used to uniquely identify the VNF package. For example, the ID may be specifically an ID of a VNFD.

Type: For example, type values may include: public and private. If a type value is public, the type of the VNF package is a public type, that is, the VNF package may be used by any user equipment or NSD. If a type value is private, the type of the VNF package is a private type, that is, the VNF package can be used only by designated user equipment or a designated NSD. The designated user equipment or NSD may also be referred to as an authorized user.

Vendor: indicates a vendor of the VNF package.

Functionality: indicates functionality of the VNF package. For example, functionality of a VNF package may be a firewall, or may be a Packet Data Network Gateway (P-GW), or the like.

Authorized Scope (AS): indicates a scope of an authorized user for the VNF package. This parameter may also be referred to as a scope parameter of an authorized user for the VNF package. If a type value is public, an AS value may be all. If a type value is private, an AS value may be a specific value. Specifically, if a VNF package has only one authorized user, an AS of the VNF package may include only one value. If a VNF package has multiple authorized users, an AS of the VNF package may include only one value, or may include multiple values. In a first case, for a VNF package, each authorized user is corresponding to one AS value. In this case, a quantity of authorized users is equal to that of AS values. In a second case, for a VNF package, all authorized users are corresponding to one AS value. In this case, regardless of a quantity of authorized users, there is only one AS value. In a third case, for a VNF package, some authorized users are corresponding to one AS value. In this case, a quantity of AS values is greater than 1, and is less than a quantity of authorized users. Specifically, an AS value form may be a combination, for example, may be an identifier+a validate code. For example, an AS value is "Vendor X: validate code". For example, another AS value is "NSD ID: validate code". Certainly, an AS value may be presented in another manner. A specific AS value form is not limited in the present invention.

Status: indicates a current status of the VNF package. For example, values of this parameter may include enabled and disabled. If a value of this parameter is enabled, the VNF package can be used, and a parameter in the record information about the VNF package can be modified. If a value of this parameter is disabled, the VNF package cannot be used, and a parameter in the record information about the VNF package cannot be modified.

User: indicates an authorized user of the VNF package. If a type value is private, a user value may be identity information about user equipment, and there may be one or more users. If a type value is public, a user value may be identity information about user equipment, that is, identity information about all user equipments that can use the VNF package. Alternatively, if there is user equipment being using or referencing the VNF package, a user value may be identity information about this user equipment.

User States: User states values may include used, referenced, and enabled. If a type value is private, there is a user states value for each authorized user of the VNF package, to describe a current state of using the VNF package by user equipment. If a type value is public, for each user equipment that can use the VNF package or each user equipment being currently using or referencing the VNF package, there is a user states value, to describe a current state of using the VNF package by user equipment. If a user states value is used, user equipment is using the VNF package currently, or a VNF instance is running. If a user states value is referenced, user equipment is referencing the VNF package currently, but the VNF is not instantiated. If a user states value is enabled, user equipment is not using or referencing the VNF package currently, but the user equipment has permission to use or reference the VNF package. In the embodiments of the present invention, using a VNF package indicates instantiating the VNF. Therefore, using is different from referencing.

In addition, there may be a reservation. For example, the reservation is referred to as "other", and is used to record other information about the VNF package.

In addition, the record information about the VNF package may further include other possible parameters. The parameters may be set according to a specific requirement.

For example, referring to Table 1, Table 1 shows possible record information about a VNF package.

TABLE 1

| ID | Type | Vendor | Functionality | AS | Status | User | User States | Other |
|---|---|---|---|---|---|---|---|---|
| VNFD_11 | Private | A | firewall | NSD_11:1234<br>NSD_12:1235<br>NSD_13:1236 | enabled | NSD_1<br>NSD_2<br>NSD_3 | Used<br>Referenced<br>Used | |

It can be seen from Table 1 that: an ID of this VNF package is VNFD_11, a type value is private, a vendor is A, functionality is a firewall, and the VNF package has three authorized users of NSD_1, NSD_2, and NSD_3. In an example shown in Table 1, each user equipment is corresponding to one AS value, and states of using the VNF package by the three user equipments are recorded in user states. It should be noted that Table 1 is only an example. Value formats of all parameters in Table 1 do not represent an actual case. In actual application, a person skilled in the art certainly knows how to set values for these parameters.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following further describes the embodiments of the present invention in detail with reference to this specification.

Figure 2:
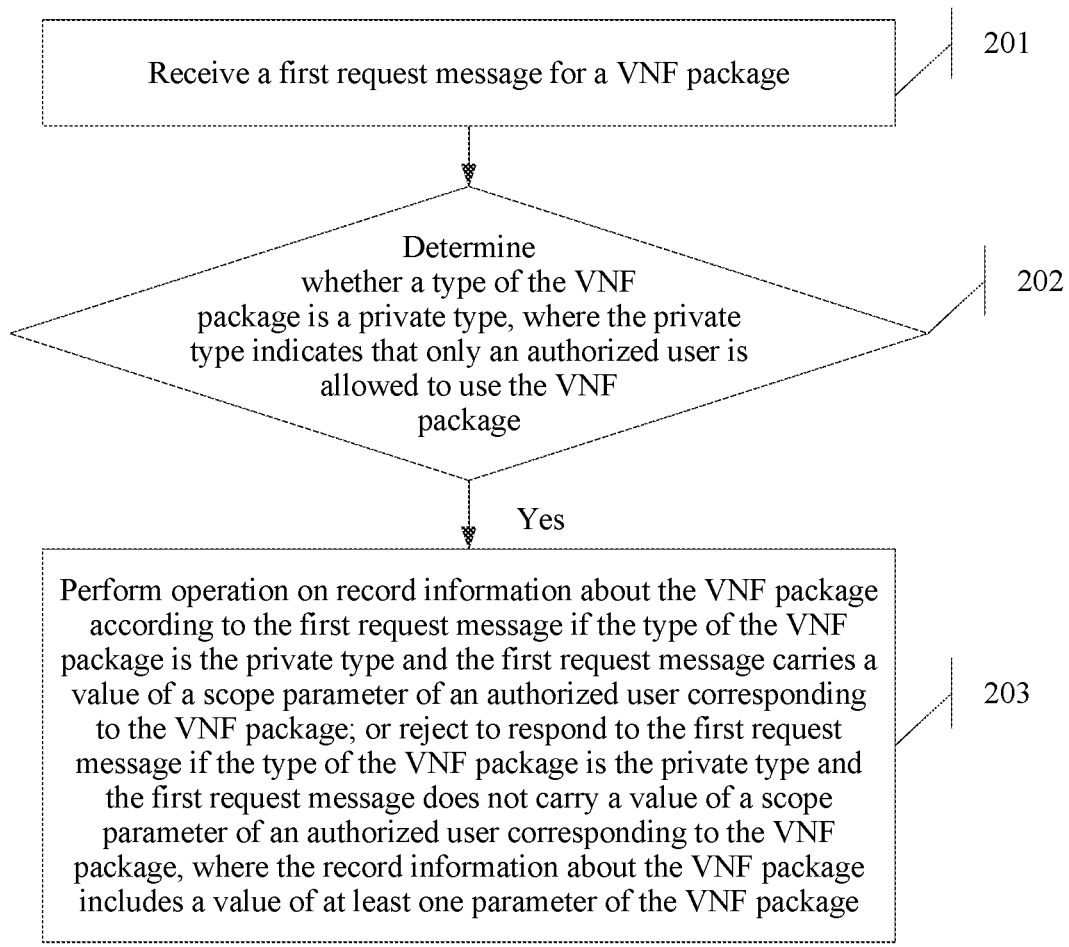
FIG. 2 is a main flowchart of a VNF package operation method according to an embodiment of the present invention.

Referring to FIG. 2, an embodiment of the present invention provides a VNF package operation method. For a hardware architecture on which the method depends, refer to FIG. 1. Specifically, the method may be implemented by an NFVO shown in FIG. 1. A main procedure of the method is described as follows.

Step 201: Receive a first request message for a VNF package.

Step 202: Determine whether a type of the VNF package is a private type, where the private type indicates that only an authorized user is allowed to use the VNF package.

Step 203: Perform operation on record information about the VNF package according to the first request message if the type of the VNF package is the private type and the first request message carries a value of a scope parameter of an authorized user corresponding to the VNF package; or reject to respond to the first request message if the type of the VNF package is the private type and the first request message does not carry a value of a scope parameter of an authorized user corresponding to the VNF package, where the record information about the VNF package includes a value of at least one parameter of the VNF package.

In this embodiment of the present invention, if the type of the VNF package is the private type, when operation needs to be performed on the record information about this VNF package, the request message (referred to as the first request message in this embodiment of the present invention) needs to carry the value of the scope parameter of the authorized user corresponding to the VNF package. If the first request message does not carry the value of the scope parameter of the authorized user corresponding to the VNF package, and the first request message is further used to request information about another VNF package of a public type, an NFVO may return the information about this public VNF package to a sending party of the first request message, but the NFVO may reject to return information that is of the private VNF package and that is requested by using the first request message. In this way, only the authorized user can be allowed to use the VNF package of the private type, so as to improve information security.

In this embodiment of the present invention, a sending party of the first request message may be referred to as a sender, and is a node or user equipment that can send an instruction to an NFVO, for example, an OSS/a BSS, or a vendor.

Specifically, whether a type of a VNF package is the private type may be determined by using a type value in record information about the VNF package.

Optionally, in this embodiment of the present invention, after the determining whether a type of the VNF package is a private type, the method further includes:

performing operation on the record information about the VNF package according to the first request message if the type of the VNF package is not the private type.

That is, if the type of the VNF package is not the private type, but is, for example, a public type, the NFVO may process the first request message in a manner in the prior art. Details are not described herein.

Optionally, in this embodiment of the present invention, the performing operation on record information about the VNF package according to the first request message if the type of the VNF package is the private type and the first request message carries a value of a scope parameter of an authorized user corresponding to the VNF package includes:

determining whether the value of the scope parameter is consistent with a preset value of the scope parameter of the authorized user for the VNF package, if the type of the VNF package is the private type and the first request message carries the value of the scope parameter of the authorized user corresponding to the VNF parameter; and performing operation on the record information according to the first request message if the value of the scope parameter is consistent with the preset value of the scope parameter of the authorized user for the VNF package.

That is, if the first request message carries an AS value, the NFVO may first determine whether the AS value carried in the first request message is consistent with a preset AS value. If the AS value is inconsistent with the preset AS value, the first request message may be unauthorized, and the NFVO may reject to respond, so as to further protect information security.

In this embodiment of the present invention, the first request message may have different applications. The following separately describes the applications.

A first application is as follows.

Optionally, in this embodiment of the present invention, the first request message is used to request to query, in the record information, a value of a first parameter of the VNF package. That is, the first request message carries a parameter used to request a receive end to query the first parameter.

The performing operation on the record information according to the first request message includes:

querying, in the record information, the value of the first parameter according to the first request message.

The first parameter may be any one parameter in the at least one parameter included in the foregoing described record information about the VNF package.

For example, if the first parameter is an ID of the VNF package, the first request message is used to request to query whether the VNF package exists.

For example, if the first parameter is functionality of the VNF package, the first request message is used to request to query all VNF packages with this functionality. In this case, if a query result includes a VNF package of the private type, and the first request message carries an AS value corresponding to the VNF package of the private type, the private VNF package may be included in a returned result. However, if the first request message does not carry an AS value, or does not carry an AS value corresponding to the queried VNF package of the private type, the VNF package of the private type is not included in a returned result.

If the query succeeds, the NFVO returns a query result to the sending party of the first request message. If the NFVO rejects to respond to the first request message, or the NFVO responds to the first request message but the query fails, the NFVO returns a response failure message to the sending party of the first request message.

In the prior art, for a received query request message, an NFVO returns information about all VNF packages that meet a condition. However, in this embodiment of the present invention, because the private type is defined, the NFVO determines, according to whether the first request message includes an AS value and whether the AS value is correct, whether the returned result includes information about the VNF package of the private type, so that the query result is more pertinent.

A second application is as follows.

Optionally, in this embodiment of the present invention, the first request message is used to request to change a value that is of a first parameter of the VNF package and that is recorded in the record information. That is, the first request message carries a parameter that is used to request a receive end to change the first parameter.

The performing operation on the record information according to the first request message includes:

updating the value of the first parameter in the record information to an expected value according to the expected value that is of the first parameter and that is carried in the first request message, if the value of the scope parameter is consistent with the preset value of the scope parameter.

In this embodiment of the present invention, a value that is of the first parameter and that is carried in the first request message is referred to as the expected value of the first parameter. The first parameter may be any parameter in all parameters included in the foregoing described record information about the VNF package.

If a value of a parameter in the record information about the VNF package needs to be changed, a premise is that the VNF package is not used or referenced by other user equipment or another NSD. If the VNF package is being used or referenced by other user equipment or another NSD, operation performed by the NFVO fails even if an AS value carried in the first request message is consistent with a preset AS value. The NFVO returns a response failure message to the sending party of the first request message.

For example, if the first request message is used to request to change, into public, the type of the VNF package whose type is originally the private type, the first request message includes at least an ID of the VNF package, a new type value, and an AS value of the VNF package.

For example, if the first request message is used to request to update a status value of the VNF package, the first request message includes at least an ID of the VNF package, a new status value, and an AS value of the VNF package.

For example, if the first request message is triggered by NSD update, the first request message includes at least an ID of the VNF package, a user of the VNF package, user states of the VNF package, and an AS value of the VNF package.

If the update succeeds, the NFVO returns an update success message to the sending party of the first request message. If the NFVO rejects to respond to the first request message, or the NFVO responds to the first request message but the update fails, the NFVO returns a response failure message to the sending party of the first request message.

This embodiment of the present invention proposes a concept of record information of a VNF package. This concept does not exist in the prior art. This embodiment of the present invention further provides a method for updating the record information of the VNF package, so as to better manage a VNF package.

A third application is as follows.

Optionally, in this embodiment of the present invention, the first request message carries information about second user equipment, and the first request message is used to request to authorize the second user equipment to use the VNF package. That is, the first request message carries a parameter used to request a receive end to authorize the second user equipment to use the VNF package.

The performing operation on the record information according to the first request message includes:

updating, according to the value of the scope parameter and the information about the second user equipment, a value that is of a parameter of an authorized user for the VNF package and that is recorded in the record information about the VNF package, where an updated value of the parameter of the authorized user is used to indicate that the second user equipment has permission to use the VNF package. That is, after the value that is of the parameter of the authorized user and that is recorded in the record information is updated, the second user equipment has permission to use the VNF package.

The authorized user parameter may be the user parameter in the foregoing described record information about the VNF package.

For example, if the second user equipment is not authorized to use the VNF package before, the second user equipment or another sending party may send the first request message to the NFVO, to request to authorize the second user equipment to use the VNF package. The first request message may carry an ID of the VNF package, the information about the second user equipment (in this embodiment of the present invention, information about user equipment may be identity information about the user equipment), and an AS value of the VNF package. After the NFVO receives the first request message, if it is determined that the AS value carried in the first request message is consistent with an AS value that is of the VNF package and that is recorded in the record information about the VNF package, the NFVO may add the information about the second user equipment to the user parameter recorded in the record information about the VNF package. In this way, a scope of an authorized user for the VNF package is updated, and the second user equipment can use or reference the VNF package.

However, if the NFVO determines that the AS value carried in the first request message is inconsistent with an AS value that is of the VNF package and that is recorded in the record information about the VNF package, or the first request message does not carry an AS value, the NFVO rejects to respond to the first request message. For example, the NFVO directly sends a response failure message to the sending party of the first request message.

In addition, if the operation fails, that is, if the VNF package is being used or referenced by other user equipment or another NSD, the record information about the VNF package cannot be updated. In this case, the NFVO also sends the response failure message to the sending party of the first request message.

However, if the information about the second user equipment is successfully added to the record information about the VNF package, the NFVO returns an update success message to the sending party of the first request message.

A fourth application is as follows.

The first request message carries information about first user equipment, and the first request message is used to request to close permission of using the VNF package by the first user equipment. That is, the first request message carries a parameter used to request a receive end to close the permission of using the VNF package by the first user equipment.

The determining whether the value of the scope parameter is consistent with a preset value of the scope parameter of the authorized user for the VNF package, if the type of the VNF package is the private type and the first request message carries the value of the scope parameter of the authorized user for the VNF package includes:

if the type of the VNF package is the private type and the first request message carries the value of the scope parameter of the authorized user for the VNF package, determining whether the value of the scope parameter is consistent with a preset value of a scope parameter of the authorized first user equipment for the VNF package.

The performing operation on the record information according to the first request message if the value of the scope parameter is consistent with the preset value of the scope parameter of the authorized user for the VNF package includes: if the value of the scope parameter is consistent with the preset value of the scope parameter of the authorized first user equipment for the VNF package, updating, according to the first request message and the information about the first user equipment, a value that is of a parameter of an authorized user for the VNF package and that is recorded in the record information, where an updated value of the parameter of the authorized user is used to indicate that the first user equipment has no permission to use the VNF package. That is, after the value that is of the authorized user parameter and that is recorded in the record information is updated, the first user equipment has no permission to use the VNF package.

Specifically, if the first request message is used to request to close the permission of using the VNF package by the first user equipment, the NFVO may determine whether an AS value carried in the first request message is consistent with an AS value that is corresponding to the first user equipment and that is recorded in the record information about the VNF package. The AS value that is corresponding to the first user equipment and that is recorded in the record information about the VNF package may be a specific AS value corresponding to the first user equipment. Alternatively, the VNF package may include only one AS value. This value is corresponding to all authorized users of the VNF package. Certainly, this value is corresponding to the first user equipment.

If the AS value carried in the first request message is inconsistent with the AS value that is corresponding to the first user equipment and that is recorded in the record information about the VNF package, the NFVO may reject to respond to the first request message, and send a response failure message to the sending party of the first request message.

If the AS value carried in the first request message is consistent with the AS value that is corresponding to the first user equipment and that is recorded in the record information about the VNF package, the NFVO may delete the information about the first user equipment from a user value recorded in the record information about the VNF package. In this way, the first user equipment has no permission to use the VNF package.

If the operation succeeds, the NFVO sends an update success message to the sending party of the first request message.

In the prior art, if user equipment requests to change a status of a VNF package into disabled, and an NFVO executes this operation, permission of using the VNF package by all user equipments is closed. Therefore, some user equipments that need to use the VNF package cannot normally use the VNF package. However, in this embodiment of the present invention, a private type is defined, so that only some user equipments are authorized to use a VNF package or permission to only some user equipments is closed. Therefore, user equipment that needs to use a VNF package of the private type can normally use the VNF package. For user equipment that does not need to use or cannot use the VNF package of the private type, permission of the user equipment may be closed, so that the prior-art problem is resolved.

Specifically, in this embodiment of the present invention, the record information about the VNF package may be stored in a VNF catalog. Specifically, if the NFVO needs to perform operation on the record information about the VNF package, the NFVO may send a request to the VNF catalog, to request the VNF catalog to perform operation on the record information about the VNF package. After operation of the VNF catalog ends, if the operation succeeds, an operation success message is fed back to the NFVO. If the operation fails, an operation failure message is fed back to the NFVO.

Optionally, in this embodiment of the present invention, before the receiving a first request message for a VNF package, the method further includes:

receiving a second request message, where the second request message is used to request to create the record information, and the second request message carries the value of the at least one parameter in the record information;

extracting the value that is of the at least one parameter and that is carried in the second request message; and instructing, according to the value of the at least one parameter, the VNF catalog to create the record information.

That is, after a VNF package is created, record information about the VNF package may be created, to facilitate subsequent management of the VNF package.

The NFVO receives a VNF package on-boarding (on-boarding) request message sent by the sending party. In this embodiment of the present invention, the VNF package on-boarding request message is referred to as the second request message. For example, the second request message may include the VNF package, identity and authorization information about the VNF package.

The NFVO performs verification on the VNF package. The verification includes verification of a VNFD, to verify whether a required element exists in the VNFD.

After the verification succeeds, the NFVO analyzes the VNF package, and the identity and authorization information about the VNF package, to obtain at least one parameter for creating the record information about the VNF package. For example, parameters that need to be obtained include an ID of the VNF package, a type, a vendor, functionality, an authorized scope, a status, a user, user states, and the like.

After the verification succeeds, the NFVO sends a notification message to the VNF catalog. The notification message may include the VNF package, and a value of each parameter included in the record information about the VNF package.

After receiving the notification message from the NFVO, the VNF catalog creates new record information about the VNF package, to record the value of each parameter of the VNF package.

If the NFVO receives an operation success message sent by the VNF catalog, the NFVO uploads an image(s) to a VIM. The image(s) is a software image of the VNF package, and is used to implement a function of the VNF package.

After receiving the image(s), the VIM performs uploading on a module (such as a database) that stores the software image. After the uploading succeeds, the VIM feeds back an image(s) uploading success message to the NFVO.

After receiving the image(s) uploading success message fed back by the VIM, the NFVO feeds back an uploading success message to the sending party of the first request message.

A concept of record information of a VNF package does not exist in the prior art. Certainly, there is no process of creating record information of a VNF package. This embodiment of the present invention proposes the concept of the record information of the VNF package, and proposes a process of creating the record information of the VNF package, so as to better manage a VNF package.

Figure 3:
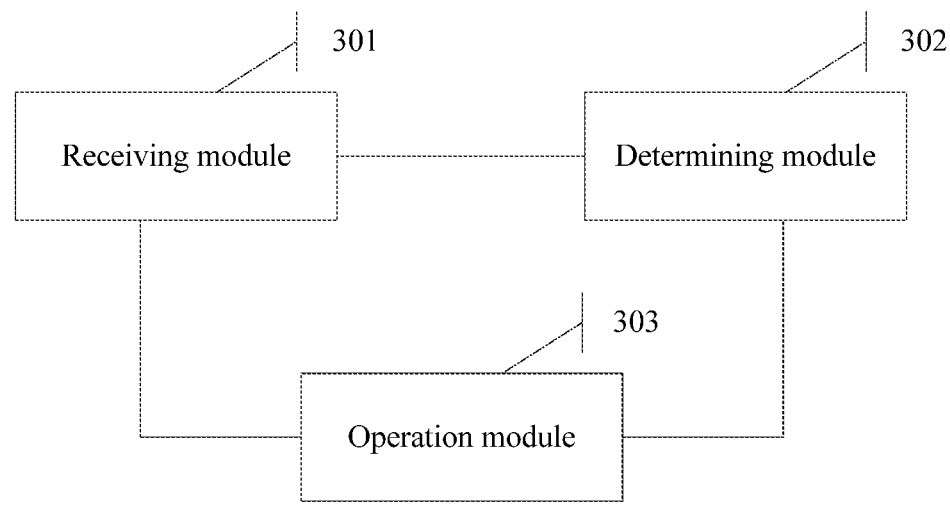
FIG. 3 is a structural block diagram of a VNF package operation apparatus according to an embodiment of the present invention.

Referring to FIG. 3, based on a same invention concept, an embodiment of the present invention provides a VNF package operation apparatus. For example, the apparatus may be an NFVO, or may be another apparatus. The apparatus may include a receiving module 301, a determining module 302, and an operation module 303.

The receiving module 301 is configured to receive a first request message for a VNF package.

The determining module 302 is configured to determine whether a type of the VNF package is a private type. The private type indicates that only an authorized user is allowed to use the VNF package.

The operation module 303 is configured to: perform operation on record information about the VNF package according to the first request message if the type of the VNF package is the private type and the first request message carries a value of a scope parameter of an authorized user corresponding to the VNF package; or reject to respond to the first request message if the type of the VNF package is the private type and the first request message does not carry a value of a scope parameter of an authorized user corresponding to the VNF package. The record information about the VNF package includes a value of at least one parameter of the VNF package.

Optionally, in this embodiment of the present invention, that the operation module 303 is configured to perform operation on record information about the VNF package according to the first request message if the type of the VNF package is the private type and the first request message carries a value of a scope parameter of an authorized user corresponding to the VNF package is specifically:

if the type of the VNF package is the private type and the first request message carries the value of the scope parameter of the authorized user corresponding to the VNF package, determining whether the value of the scope parameter is consistent with a preset value of the scope parameter of the authorized user for the VNF package; and performing operation on the record information according to the first request message if the value of the scope parameter is consistent with the preset value of the scope parameter of the authorized user for the VNF package.

Optionally, in this embodiment of the present invention, the first request message is used to request to query, in the record information, a value of a first parameter of the VNF package. That the operation module 303 is specifically configured to perform operation on the record information according to the first request message is specifically:

querying, in the record information, the value of the first parameter according to the first request message, if the value of the scope parameter is consistent with the preset value of the scope parameter.

Optionally, in this embodiment of the present invention, the first request message is used to request to change a value that is of a first parameter of the VNF package and that is recorded in the record information. That the operation module 303 is specifically configured to perform operation on the record information according to the first request message is specifically:

updating the value of the first parameter in the record information to an expected value according to the expected value that is of the first parameter and that is carried in the first request message, if the value of the scope parameter is consistent with the preset value of the scope parameter.

Optionally, in this embodiment of the present invention, the first request message carries information about first user equipment, and the first request message is used to request to close permission of using the VNF package by the first user equipment.

That the operation module 303 is specifically configured to: if the type of the VNF package is the private type and the first request message carries the value of the scope parameter of the authorized user for the VNF package, determine whether the value of the scope parameter is consistent with a preset value of the scope parameter of the authorized user for the VNF package is specifically:

if the type of the VNF package is the private type and the first request message carries the value of the scope parameter of the authorized user for the VNF package, determining whether the value of the scope parameter is consistent with a preset value of a scope parameter of the authorized first user equipment for the VNF package.

That the operation module 303 is specifically configured to perform operation on the record information according to the first request message if the value of the scope parameter is consistent with the preset value of the scope parameter of the authorized user for the VNF package is specifically:

if the value of the scope parameter is consistent with the preset value of the scope parameter of the authorized first user equipment for the VNF package, updating, according to the first request message and the information about the first user equipment, a value that is of a parameter of an authorized user for the VNF package and that is recorded in the record information, where an updated value of the parameter of the authorized user is used to indicate that the first user equipment has no permission to use the VNF package.

Optionally, in this embodiment of the present invention, the first request message carries information about second user equipment, and the first request message is used to request to authorize the second user equipment to use the VNF package.

That the operation module 303 is specifically configured to perform operation on the record information according to the first request message is specifically:

updating, according to the value of the scope parameter and the information about the second user equipment, a value that is of a parameter of an authorized user for the VNF package and that is recorded in the record information, where an updated value of the parameter of the authorized user is used to indicate that the second user equipment has permission to use the VNF package.

Optionally, in the embodiment of the present invention, the apparatus further includes a parsing module and a notification module.

The receiving module 301 is further configured to receive a second request message before receiving the first request message for the VNF package. The second request message is used to request to create the record information. The second request message carries the value of the at least one parameter in the record information.

The parsing module is configured to extract the value that is of the at least one parameter and that is carried in the second request message.

The notification module is configured to instruct, according to the value of the at least one parameter, a VNF catalog to create the record information.

Optionally, in this embodiment of the present invention, the operation module 303 is further configured to:

after determining whether the type of the VNF package is the private type, perform operation on the record information according to the first request message if the type of the VNF package is not the private type.

Figure 4:
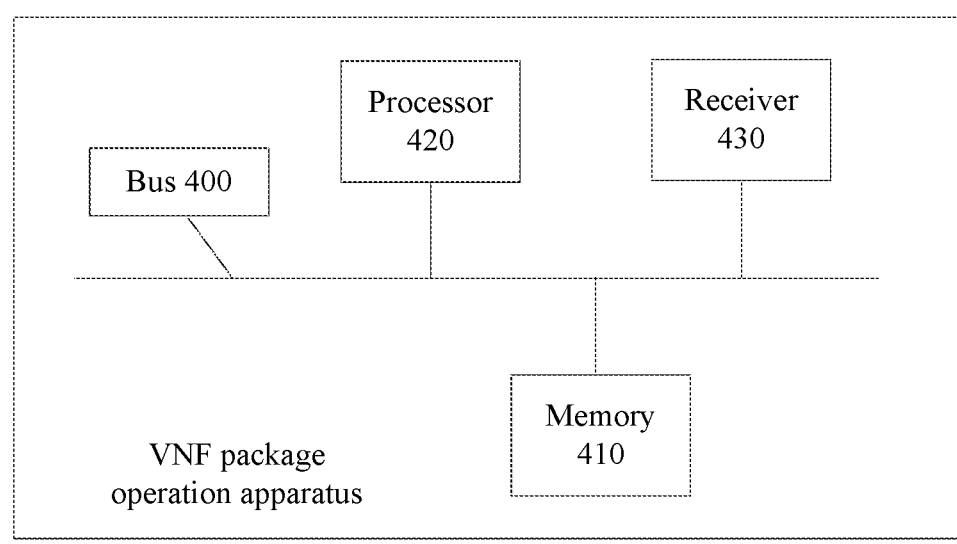
FIG. 4 is a schematic structural diagram of a VNF package operation apparatus according to an embodiment of the present invention.

Referring to FIG. 4, based on a same invention concept, an embodiment of the present invention provides a VNF package operation apparatus. For example, the apparatus may be an NFVO, or may be another apparatus. The apparatus may include a memory 401, a processor 402, and a receiver 403 that are connected to a bus 400.

The memory 401 is configured to store an instruction required by the processor 402 to execute a task.

The receiver 403 is configured to receive a first request message for a VNF package.

The processor 402 is configured to execute the instruction to: determine whether a type of the VNF package is a private type, where the private type indicates that only an authorized user is allowed to use the VNF package; and perform operation on record information about the VNF package according to the first request message if the type of the VNF package is the private type and the first request message carries a value of a scope parameter of an authorized user corresponding to the VNF package; or reject to respond to the first request message if the type of the VNF package is the private type and the first request message does not carry a value of a scope parameter of an authorized user corresponding to the VNF package, where the record information about the VNF package includes a value of at least one parameter of the VNF package.

Optionally, in this embodiment of the present invention, that the processor 402 is configured to perform operation on record information about the VNF package according to the first request message if the type of the VNF package is the private type and the first request message carries a value of a scope parameter of an authorized user corresponding to the VNF package is specifically:

if the type of the VNF package is the private type and the first request message carries the value of the scope parameter of the authorized user corresponding to the VNF package, determining whether the value of the scope parameter is consistent with a preset value of the scope parameter of the authorized user for the VNF package; and performing operation on the record information according to the first request message if the value of the scope parameter is consistent with the preset value of the scope parameter of the authorized user for the VNF package.

Optionally, in this embodiment of the present invention, the first request message is used to request to query, in the record information, a value of a first parameter of the VNF package.

That the processor 402 is specifically configured to perform operation on the record information according to the first request message is specifically:

querying, in the record information, the value of the first parameter according to the first request message.

Optionally, in this embodiment of the present invention, the first request message is used to request to change a value that is of a first parameter of the VNF package and that is recorded in the record information.

That the processor 402 is specifically configured to perform operation on the record information according to the first request message is specifically:

updating the value of the first parameter in the record information to an expected value according to the expected value that is of the first parameter and that is carried in the first request message.

Optionally, in this embodiment of the present invention, the first request message carries information about first user equipment, and the first request message is used to request to close permission of using the VNF package by the first user equipment.

That the processor 402 is specifically configured to: if the type of the VNF package is the private type and the first request message carries the value of the scope parameter of the authorized user for the VNF package, determine whether the value of the scope parameter is consistent with a preset value of the scope parameter of the authorized user for the VNF package is specifically:

if the type of the VNF package is the private type and the first request message carries the value of the scope parameter of the authorized user for the VNF package, determining whether the value of the scope parameter is consistent with a preset value of a scope parameter of the authorized first user equipment for the VNF package.

That the processor 402 is specifically configured to perform operation on the record information according to the first request message if the value of the scope parameter is consistent with the preset value of the scope parameter of the authorized user for the VNF package is specifically:

if the value of the scope parameter is consistent with the preset value of the scope parameter of the authorized first user equipment for the VNF package, updating, according to the first request message and the information about the first user equipment, a value that is of a parameter of an authorized user for the VNF package and that is recorded in the record information, where an updated value of the parameter of the authorized user is used to indicate that the first user equipment has no permission to use the VNF package.

Optionally, in this embodiment of the present invention, the first request message carries information about second user equipment, and the first request message is used to request to authorize the second user equipment to use the VNF package.

That the processor 402 is specifically configured to perform operation on the record information according to the first request message is specifically:

updating, according to the value of the scope parameter and the information about the second user equipment, a value that is of a parameter of an authorized user for the VNF package and that is recorded in the record information, where an updated value of the parameter of the authorized user is used to indicate that the second user equipment has permission to use the VNF package.

Optionally, in this embodiment of the present invention, the receiver 403 is further configured to:

receive a second request message before receiving the first request message for the VNF package, where the second request message is used to request to create the record information, and the second request message carries the value of the at least one parameter in the record information.

The processor 402 is further configured to:

extract the value that is of the at least one parameter and that is carried in the second request message; and instruct, according to the value of the at least one parameter, a VNF catalog to create the record information.

Optionally, in this embodiment of the present invention, the processor 402 is further configured to:

after determining whether the type of the VNF package is the private type, perform operation on the record information according to the first request message if the type of the VNF package is not the private type.

In this embodiment of the present invention, a private type of a VNF package is defined. If a type of a VNF package is the private type, only an authorized user is allowed to use this VNF package, so that the VNF package can be opened to only some user equipments. A specific authorization scope may be self-defined. Therefore, information security is improved, and the problem that cannot be resolved in the prior art is resolved, so as to provide a better service for a user.

In addition, in this embodiment of the present invention, if operation needs to be performed on record information about a VNF package of the private type, the first request message needs to carry a value of a scope parameter of an authorized user corresponding to the VNF package. In this way, operation can be performed on the record information about the VNF package. Otherwise, if the first request message does not carry a value of a scope parameter of an authorized user corresponding to the VNF package, an operation on the record information about the VNF package may be rejected, that is, a response to the first request message is rejected. Certainly, no operation result is fed back to a requester. For example, if a user beyond a scope of an authorized user for the VNF package intends to perform operation on the record information about the VNF package, the first request message sent by this user may not carry the value of the scope parameter of the authorized user corresponding to the VNF package. Therefore, a receiver rejects the operation. In this way, information security can be protected as far as possible, and a new VNF package management and operation method is provided.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely used to describe the technical solutions of the present application. The foregoing embodiments are merely intended to help understand the method and core idea of the present invention, and shall not be construed as a limitation on the present invention. Any variation or replacement readily figured out by a person skilled in the art within the technical scope disclosed in the present invention shall fall within the protection scope of the present invention.

What is claimed is:

1. A virtualized network function (VNF) package operation method, comprising:
receiving a first request message for a VNF package;
determining whether a type of the VNF package is a private type, wherein the private type indicates that only an authorized user is allowed to use the VNF package; and
performing operation on record information about the VNF package according to the first request message if the type of the VNF package is the private type and the first request message carries a value of a scope parameter of an authorized user corresponding to the VNF package; or rejecting to respond to the first request message if the type of the VNF package is the private type and the first request message does not carry a value of a scope parameter of an authorized user corresponding to the VNF package, wherein the record information about the VNF package comprises a value of at least one parameter of the VNF package.

2. The method according to claim 1, wherein before the receiving a first request message for a VNF package, the method further comprises:
receiving a second request message, wherein the second request message is used to request to create the record information, and the second request message carries the value of the at least one parameter in the record information;
extracting the value that is of the at least one parameter and that is carried in the second request message; and
instructing, according to the value of the at least one parameter, a VNF catalog to create the record information.

3. The method according to claim 1, wherein after the determining whether a type of the VNF package is a private type, the method further comprises:
performing operation on the record information according to the first request message if the type of the VNF package is not the private type.

4. The method according to claim 1, wherein the performing operation on record information about the VNF package according to the first request message if the type of the VNF package is the private type and the first request message carries a value of a scope parameter of an authorized user corresponding to the VNF package comprises:
determining whether the value of the scope parameter is consistent with a preset value of the scope parameter of the authorized user for the VNF package, if the type of the VNF package is the private type and the first request message carries the value of the scope parameter of the authorized user corresponding to the VNF package; and
performing operation on the record information according to the first request message if the value of the scope parameter is consistent with the preset value of the scope parameter of the authorized user for the VNF package.

5. The method according to claim 4, wherein the first request message is used to request to query, in the record information, a value of a first parameter of the VNF package; and
the performing operation on the record information according to the first request message comprises:
querying, in the record information, the value of the first parameter according to the first request message.

6. The method according to claim 4, wherein the first request message is used to request to change a value that is of a first parameter of the VNF package and that is recorded in the record information; and
the performing operation on the record information according to the first request message comprises:
updating the value of the first parameter in the record information to an expected value according to the expected value that is of the first parameter and that is carried in the first request message.

7. The method according to claim 4, wherein the first request message carries information about first user equipment, and the first request message is used to request to close permission of using the VNF package by the first user equipment;

the determining whether the value of the scope parameter is consistent with a preset value of the scope parameter of the authorized user for the VNF package, if the type of the VNF package is the private type and the first request message carries the value of the scope parameter of the authorized user for the VNF package comprises:
if the type of the VNF package is the private type and the first request message carries the value of the scope parameter of the authorized user for the VNF package, determining whether the value of the scope parameter is consistent with a preset value of a scope parameter of the authorized first user equipment for the VNF package; and
the performing operation on the record information according to the first request message if the value of the scope parameter is consistent with the preset value of the scope parameter of the authorized user for the VNF package comprises:
if the value of the scope parameter is consistent with the preset value of the scope parameter of the authorized first user equipment for the VNF package, updating, according to the first request message and the information about the first user equipment, a value that is of a parameter of an authorized user for the VNF package and that is recorded in the record information, wherein an updated value of the parameter of the authorized user is used to indicate that the first user equipment has no permission to use the VNF package.

8. The method according to claim 4, wherein the first request message carries information about second user equipment, and the first request message is used to request to authorize the second user equipment to use the VNF package; and
the performing operation on the record information according to the first request message comprises:
updating, according to the value of the scope parameter and the information about the second user equipment, a value that is of a parameter of an authorized user for the VNF package and that is recorded in the record information, wherein an updated value of the parameter of the authorized user is used to indicate that the second user equipment has permission to use the VNF package.

9. A virtualized network function (VNF) package operation apparatus, comprising a memory, a processor, and a receiver that are connected to a same bus, wherein
the memory is configured to store an instruction;
the receiver is configured to receive a first request message for a VNF package; and
the processor is configured to execute the instruction to:
determine whether a type of the VNF package is a private type, wherein the private type indicates that only an authorized user is allowed to use the VNF package; and perform operation on record information about the VNF package according to the first request message if the type of the VNF package is the private type and the first request message carries a value of a scope parameter of an authorized user corresponding to the VNF package; or reject to respond to the first request message if the type of the VNF package is the private type and the first request message does not carry a value of a scope parameter of an authorized user corresponding to the VNF package, wherein the record information about the VNF package comprises a value of at least one parameter of the VNF package.

10. The apparatus according to claim 9, wherein the receiver is further configured to:
receive a second request message before receiving the first request message for the VNF package, wherein the second request message is used to request to create the record information, and the second request message carries the value of the at least one parameter in the record information; and
the processor is further configured to:
extract the value that is of the at least one parameter and that is carried in the second request message; and
instruct, according to the value of the at least one parameter, a VNF catalog to create the record information.

11. The apparatus according to claim 9, wherein the processor is further configured to:
after determining whether the type of the VNF package is the private type, perform operation on the record information according to the first request message if the type of the VNF package is not the private type.

12. The apparatus according to claim 9, wherein that the processor is configured to perform operation on record information about the VNF package according to the first request message if the type of the VNF package is the private type and the first request message carries a value of a scope parameter of an authorized user corresponding to the VNF package is specifically:
if the type of the VNF package is the private type and the first request message carries the value of the scope parameter of the authorized user corresponding to the VNF package, determining whether the value of the scope parameter is consistent with a preset value of the scope parameter of the authorized user for the VNF package; and
performing operation on the record information according to the first request message if the value of the scope parameter is consistent with the preset value of the scope parameter of the authorized user for the VNF package.

13. The apparatus according to claim 12, wherein the first request message is used to request to query, in the record information, a value of a first parameter of the VNF package; and
that the processor is specifically configured to perform operation on the record information according to the first request message is specifically:
querying, in the record information, the value of the first parameter according to the first request message.

14. The apparatus according to claim 12, wherein the first request message is used to request to change a value that is of a first parameter of the VNF package and that is recorded in the record information; and
that the processor is specifically configured to perform operation on the record information according to the first request message is specifically:
updating the value of the first parameter in the record information to an expected value according to the expected value that is of the first parameter and that is carried in the first request message.

15. The apparatus according to claim 12, wherein the first request message carries information about first user equipment, and the first request message is used to request to close permission of using the VNF package by the first user equipment;
that the processor is specifically configured to: if the type of the VNF package is the private type and the first request message carries the value of the scope parameter of the authorized user for the VNF package, determine whether the value of the scope parameter is consistent with a preset value of the scope parameter of the authorized user for the VNF package is specifically:
if the type of the VNF package is the private type and the first request message carries the value of the scope parameter of the authorized user for the VNF package, determining whether the value of the scope parameter is consistent with a preset value of a scope parameter of the authorized first user equipment for the VNF package; and
that the processor is specifically configured to perform operation on the record information according to the first request message if the value of the scope parameter is consistent with the preset value of the scope parameter of the authorized user for the VNF package is specifically:
if the value of the scope parameter is consistent with the preset value of the scope parameter of the authorized first user equipment for the VNF package, updating, according to the first request message and the information about the first user equipment, a value that is of a parameter of an authorized user for the VNF package and that is recorded in the record information, wherein an updated value of the parameter of the authorized user is used to indicate that the first user equipment has no permission to use the VNF package.

16. The apparatus according to claim 12, wherein the first request message carries information about second user equipment, and the first request message is used to request to authorize the second user equipment to use the VNF package; and
that the processor is specifically configured to perform operation on the record information according to the first request message is specifically:
updating, according to the value of the scope parameter and the information about the second user equipment, a value that is of a parameter of an authorized user for the VNF package and that is recorded in the record information, wherein an updated value of the parameter of the authorized user is used to indicate that the second user equipment has permission to use the VNF package.

* * * * *